March 26, 1963 J. H. TRAUTMANN ET AL 3,082,712
MODULAR WORK BENCH WITH STRINGERS
CONNECTING FRAME ELEMENTS
Filed March 24, 1958 3 Sheets-Sheet 2
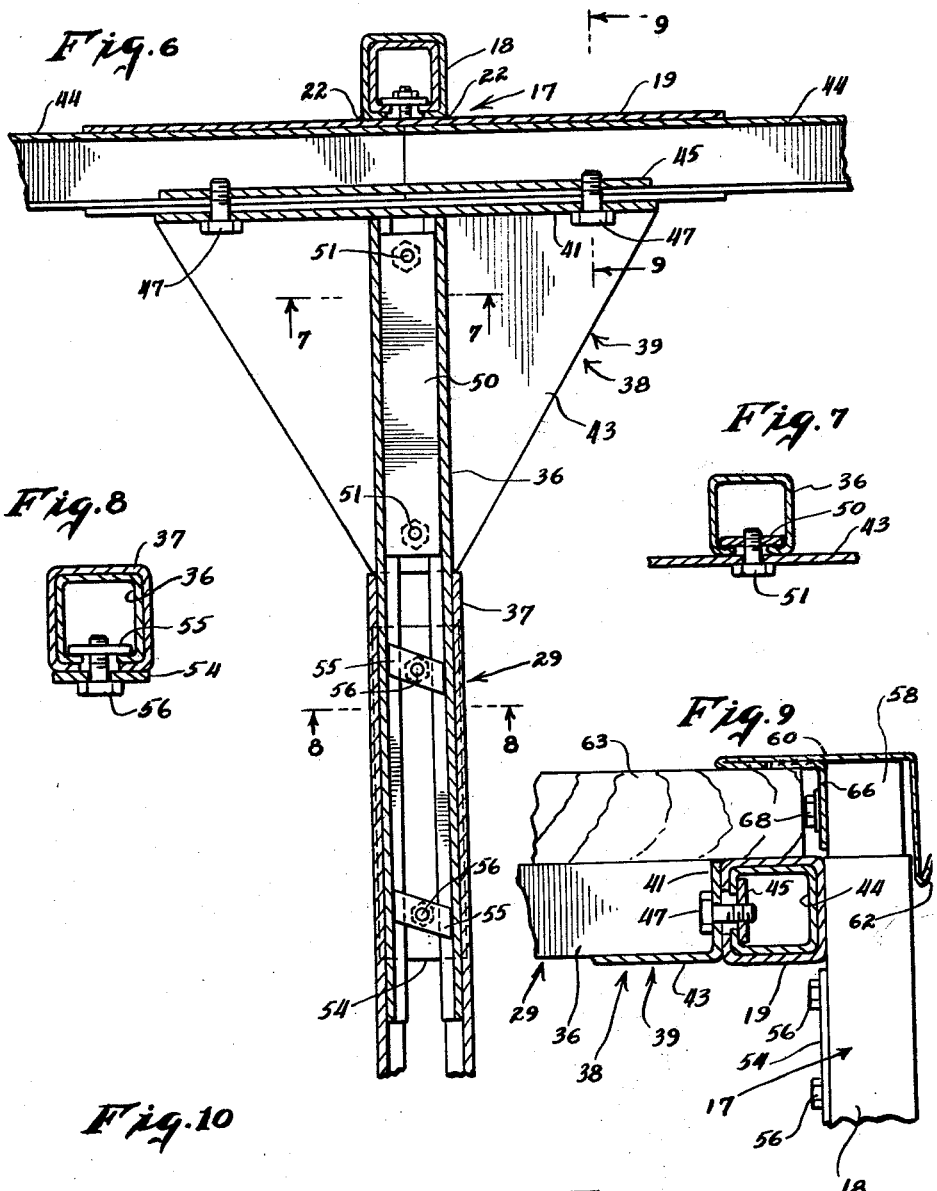
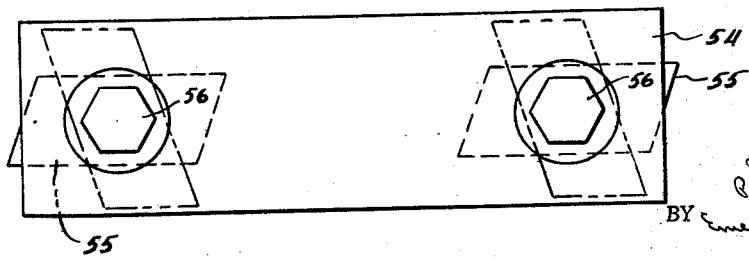
INVENTORS
John H. Trautmann
Peter W. R. Johnson
BY Emery, Whittemore,
Sandoe & Dix
ATTORNEYS

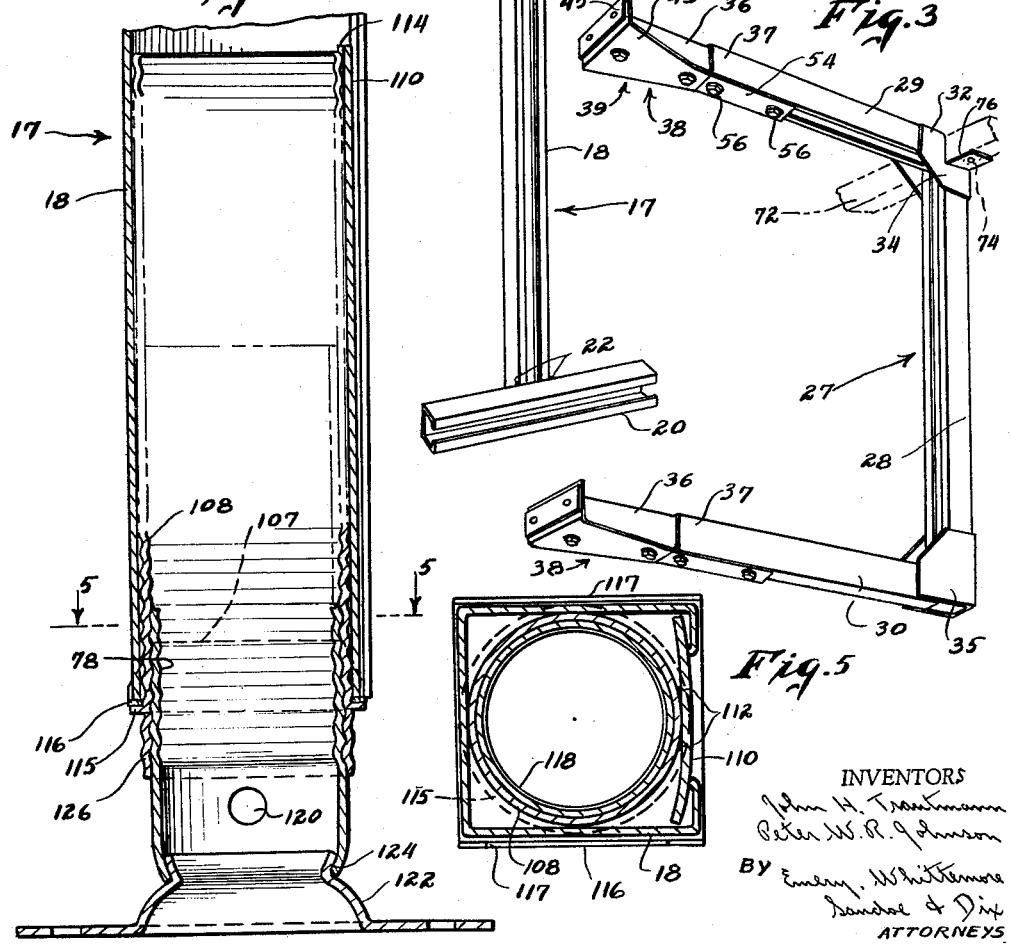

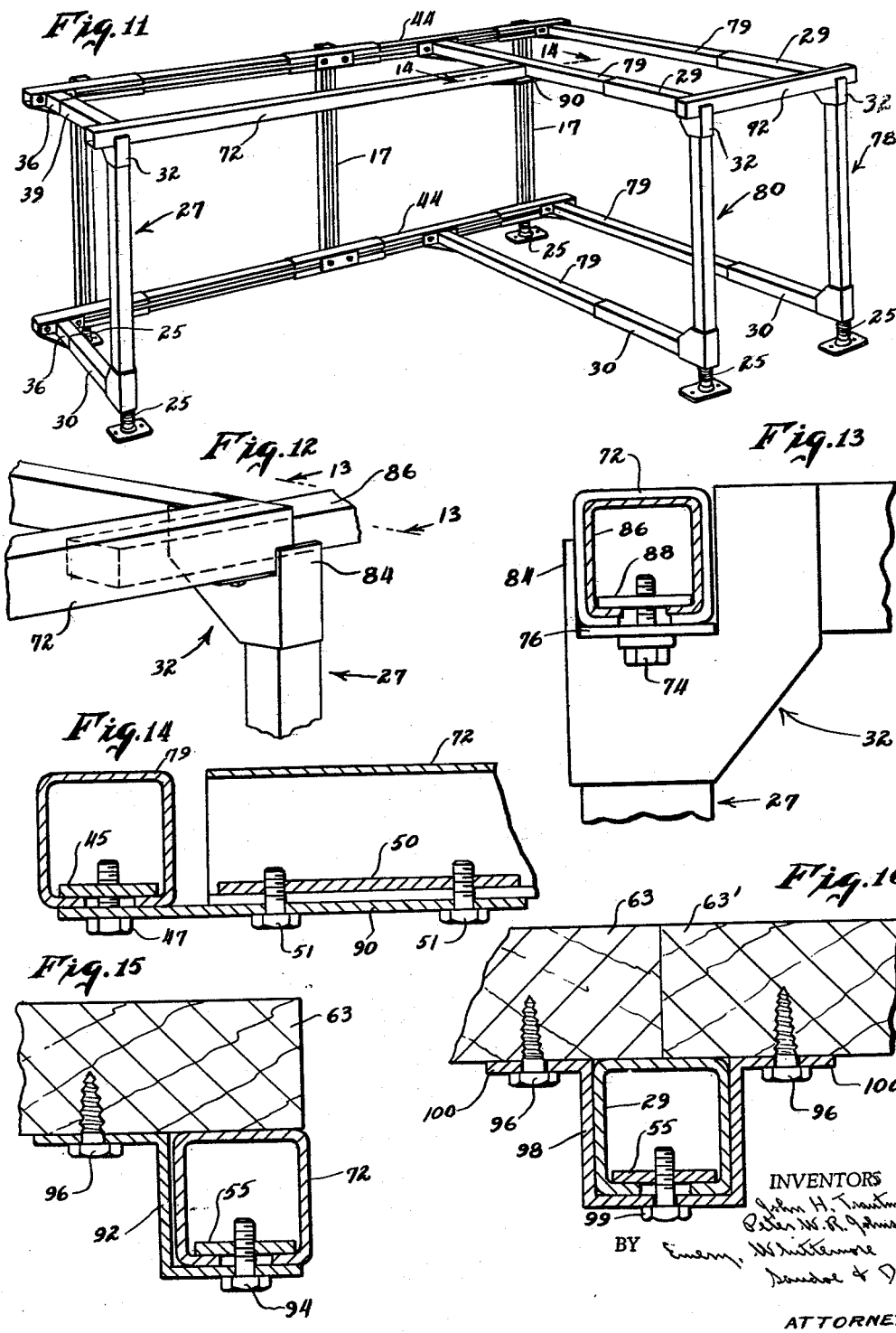

United States Patent Office 3,082,712
Patented Mar. 26, 1963

3,082,712
MODULAR WORK BENCH WITH STRINGERS CONNECTING FRAME ELEMENTS
John H. Trautmann, Southbury, and Peter W. R. Johnson, Wilton, Conn., assignors to Richard E. Deutsch, doing business as Products For Industry, Stamford, Conn., a sole proprietorship
Filed Mar. 24, 1958, Ser. No. 725,464
21 Claims. (Cl. 108—153)
(Filed under Rule 47(a) and 35 U.S.C. 116)

This invention relates to work benches and more especially to modular work benches having sections which can be joined together to make up composite benches of any desired length, and with or without variations in depth.

It is an object of this invention to provide an improved modular work bench construction made from parts which can be assembled or knocked down quickly and with only semi-skilled labor. Another object is to make such a bench with many of the different parts of the bench of similar cross-section; and more especially of an undercut channel section with novel clamping means that extend through the open sides of the channels for holding the parts of the bench in assembled relation.

Still another object of the invention is to provide a construction which is free of sway in all directions without resorting to diagonal bracing of the supports. This result is attained by making rigid sub-assemblies, for example, by welding, and with gussets where necessary; and having the field connections positioned so that there is no group of such connections capable of providing a structure that comprises, in effect, a four-bar linkage, and resulting sway unless the connections are maintained immovably tight under all conditions.

The invention includes features relating to the adjustability of parts, and to structure of the clamping means in such a way as to reduce the number of clamps required and to make their connection and operation more effective and more efficient.

Another feature of the invention relates to an improved structure for adjusting the height of the bench. This includes a screw jack construction that fits into the lower end of hollow undercut channel elements that serve as the legs of the work bench.

Other objects, features and advantages of the drawing will appear or be pointed out as the description proceeds.

In the drawing, forming a part hereof, in which like reference characters indicate corresponding parts in all the views;

FIGURE 1 is a perspective view of a partially assembled work bench embodying this invention;

FIGURE 2 is a perspective view of the back leg assembly of the work bench shown in FIGURE 1;

FIGURE 3 is a perspective view of the front leg assembly of the work bench shown in FIGURE 1;

FIGURE 4 is an enlarged sectional view through one of the adjustable foot assemblies shown in FIGURE 1;

FIGURE 5 is a sectional view taken on the line 5—5 of FIGURE 4;

FIGURE 6 is an enlarged sectional view taken on the plane 6—6 of FIGURE 1;

FIGURES 7 and 8 are sectional views taken on the lines 7—7 and 8—8, respectively, of FIGURE 6;

FIGURE 9 is an enlarged sectional view taken on the plane 9—9 of FIGURE 6;

FIGURE 10 is an enlarged detail view of one of the connectors used in the construction of the work bench shown in FIGURE 1;

FIGURE 11 is a perspective view showing an angle bench made in accordance with this invention;

FIGURE 12 is a fragmentary detail view showing a construction at the front of the bench;

FIGURE 13 is a greatly enlarged sectional view taken on the line 13—13 of FIGURE 12;

FIGURE 14 is a greatly enlarged sectional view taken on the line 14—14 of FIGURE 11; and FIGURES 15 and 16 are fragmentary, detail, sectional views showing two different ways in which panel tops may be connected with the work bench frames shown in FIGURES 1 and 11.

The work bench shown in FIGURE 1 includes a plurality of supports at longitudinally spaced locations along the bench. The supports include a back frame having spaced leg assemblies 17. Each leg assembly 17, as shown in FIGURE 2, consists of a vertical element 18, an upper horizontal element 19 and a lower horizontal element 20. The vertical element 18 and both of the horizontal elements 19 and 20 are undercut channel sections. This expression, "undercut channel," is used herein to designate a channel having its side walls extending inwardly for some distance along the open side of the channel so that the actual opening in the side of the channel is of less width than the distance between the parallel sides of the channel.

The horizontal elements 19 and 20 extend longitudinally in the assembled back frame of the work bench; and they are rigidly connected to the open side of the vertical element 18, preferably by welding 22. An adjustable foot assembly 25 (FIGURE 1) extends into the lower end of the vertical element 18 of any rear leg assemblies where the back frame is to be supported from the floor, as will be explained in connection with the horizontal bracing.

The work bench also includes front leg assemblies 27, one of which is shown in FIGURE 3. This front leg assembly includes a vertical element 28, an upper horizontal element 29 and a lower horizontal element 30. These horizontal elements 29 and 30 are preferably identical. There is an upper bracket 32 permanently secured to the upper end of the vertical element 28 and to the forward end of the horizontal element 29. This bracket is preferably connected to these elements by welding, and the bracket is made with a gusset section 34 for imparting rigidity to the front leg assembly in a vertical plane.

The lower end of the vertical element 28 is permanently and rigidly connected to the horizontal element 30 by a bracket 35 which is also made with a gusset section for imparting rigidity, and the connections to this lower bracket 35 are also preferably made by welding. A foot assembly 25 extends into the lower end of the vertical element 28.

The vertical element 28 and the horizontal elements 29 and 30 are undercut channel sections. In order to provide a degree of adjustability for the length of the horizontal elements 29 and 30, each of these elements is made in two parts. Both parts are undercut channel sections but there is an inner part 36 of similar cross section but slightly smaller than an outer part 37 so that the inner part is slidable lengthwise in the outer part to change the length of the horizontal element 29. The lower horizontal element 30 is of similar construction.

The front leg assemblies are connected to the back frame by clamping means 38. These clamping means include an angular plate 39 having a vertical panel 41 which extends across the open side of any of the channel sections of the back frame. In FIGURES 1 and 6, the angular plate 39 extends across the open side of the horizontal element 19 of the back leg assembly 17. The angular plate 39 also has a horizontal panel 43 which extends across the open side of the horizontal element 29.

The leg assemblies 17 of the back frame of the work bench are connected together by stringers 44. These stringers are undercut channel sections of slightly smaller size than the horizontal elements 19 and 20 so that the stringers 44 fit into the horizontal elements 19 and 20 and are slideable therein for making certain adjustments. For example, if the front leg assembly 27 is at the left-hand end of a bench, as viewed in FIGURE 6, then the left-hand end of the plate 39 is preferably brought even with the left-hand end of the horizontal element 19 of the back frame. Such a relation of the parts is shown at the left-hand end of the work bench shown in FIGURE 1.

If the front leg assembly 29 is to be used at an intermediate location where two modular sections of the work bench are to be connected together, then the angular plate 39 is located in a centered position with respect to the back leg assembly 17, as shown in FIGURE 6 and as shown at the intermediate supporting station of the work bench illustrated in FIGURE 1. Since the stringers 44 of the back frame are channels, it will be apparent that the angular plate 39 of the clamping means 38 can be shifted lengthwise of the back frame and used to clamp a front leg assembly at any desired location along the back frame, as will be more fully explained in connection with FIGURE 11.

The length of one of the stringers 44 determines the length of a unit of the work bench. For example, if the stringers 44 are six feet long, then the work bench will have a six-foot unit, and with units of this length it is preferable to brace the back frame with a back leg assembly 17 located at a midpoint along the stringers 44, as shown in FIGURE 1. At these locations where the stringers 44 are continuous through the horizontal elements 20 of a back leg assembly, it is not necessary to have any foot under the back leg assembly. Stringers of other lengths can be used, such as four-foot stringers, and by so combining stringers of different length, work benches of any desired total length can be obtained.

Within the stringer 44 and the horizontal element 19 there is a clamping plate 45. This clamping plate 45 is substantially wider than the channel opening of the horizontal element 19, and it has threaded openings in it for receiving bolts 47. There are preferably two such bolts, as shown in FIGURE 6, located toward opposite ends of the clamping plate 45.

The bolts 47 extend through openings in the vertical panel 41 and they clamp the edges of the undercut channels of the stringer 44 and horizontal element 19 between the panel 41 and the clamping plate 45. This provides a connection which can be adjusted lengthwise of the horizontal element 19 when the bolts are loosened. It also provides a connection which holds the stringer 44 in its adjusted position lengthwise of the horizontal element 19 at the same time that it connects the front and back leg assemblies together.

The horizontal panel 43 of the angular plate 39 is secured to the horizontal element 29 by a clamping plate 50 located within the horizontal element 29 and clamped against the inside of the channel edges by bolts 51 extending through the horizontal panel 43 and threading into the clamping plate 50.

The horizontal panel 43 tapers to a reduced width toward its forward end, from a substantial width along the full extent of the vertical panel 41, to serve as a gusset to impart rigidity in a horizontal plane to the connection between the front leg assembly and the back frame. The clamping plate 50 is preferably identical with the clamping plate 45, and it is of substantial length so as to distribute the clamping load along an extended length of the undercut channel in which this clamping plate 50 is located, and this length of plate with the extended distribution of pressure is advantageous in the end portion of the horizontal element 39 because the element includes the thickness of only one undercut channel at this location.

There are clamping means for holding the parts 36 and 37 of the front leg assembly in adjusted position with respect to one another. This clamping means includes an outer clamping plate 54, inner clamping pieces 55 and bolts 56 which extend through the outer clamping plate 54 and which thread into the inner clamping pieces 55.

These inner clamping pieces 55 are of parallelogram shape. They are narrow enough to pass through the open side of the channel sections of which the parts 36 and 37 are made. After being inserted into the channel sections, the inner clamping pieces 55 turn as the bolts 56 are rotated, and this turning movement causes the inner clamping pieces 55 to rotate until the end faces of the parallelogram come in contact with the inside surfaces of the walls of the channel sections. Since the inner clamping pieces 55 can rotate no further, further turning of the bolts 56 draws the clamping pieces 55 down against the edges of the channel sections and clamps these edges together between the clamping plate 54 and the inner clamping pieces 55.

These parallelogram-shaped clamping pieces 55 have the important advantage that they can be inserted into the undercut channels of the frame at any location and it is not necessary to slide them in from an open end of a channel section, or to insert them edgewise and then turn them after they are within the channel sections. This greatly facilitates the assembly of the work bench and saves substantial time. The use of these clamping pieces 55 for holding channel sections against relative movement is practical where edges of two channels are clamped against one another and the structure has the thickness of both channel sections for resisting possible deformation by the clamping pressure. The use of these individual clamping pieces 55 is also permissible at any location of the frame where it is not necessary to have high pressure to prevent relative movement and swaying of the frame. Where channel sections of different size telescope within one another, the only clamping pressure necessary is for preventing relative longitudinal movement of the parts.

At the upper end of the vertical element 18 of each of the back leg assemblies 17, there is an inner channel section 58 which is slideable in the vertical element 18, but which is clamped in any desired adjusted position by clamping means similar to those shown in FIGURE 8 and indicated by the same reference characters.

A cover plate 60 has a rearward section extending downwardly behind the inner channel section 58 with an upturned end 62 for supporting a skirt panel at the back of the bench when such a panel is to be used. The cover plate 60 extends forwardly over the rearward portions of a top panel 63 and then folds back in contact with the top panel 63.

An angle plate 66 is permanently attached to the underside of the cover plate 60 by spot welding, or other suitable connection, and this angle plate 66 extends across the open front of the inner channel section 58. The angle plate 66 is clamped to the inner channel section by a bolt 68 extending through an opening in the angle plate 66, through the open end of the channel section 58 and into a clamping element such as the individual clamping piece 55 of FIGURE 10.

This construction shown in FIGURE 9 has the advantage that the inner channel section 58 can be raised and lowered to accommodate panels 63 of different vertical thickness. This means that the parts can be assembled with the cover plate 60 in firm contact with the top of the panel 63 so as to hold the panel down firmly on the frame supports beneath it, and with sufficient friction to prevent the panel 63 from sliding forward or sideways.

At the front end of the work bench there are stringers 72 (FIGURE 1) which are of the same length as the stringers 44 of the back frame, but of the same cross section as the horizontal elements 19 and 20 of the back leg assemblies. These front stringers 72 are connected to the brackets 32 of the front leg assemblies by bolts 74 extending through flanges 76 (FIGURE 3) of the bracket 32. Details of this construction will be described in connection with FIGURES 12 and 13.

From the description thus far, it will be apparent that each front leg assembly 27 is a rigid structure braced against sway in a vertical plane transverse of the bench by the brackets 32, gussets 34 and the welded connections of the elements 23, 39 and 30 to the brackets 32 and 36. When these front leg assemblies 27 are connected to the back frame, the connections permit no sway in a vertical plane because such sway requires a four-bar linkage and even though the angular plates 39 are not highly rigid in the vertical plane, there are only two points for possible yielding in the vertical plane and this is not sufficient to permit sway.

Considering the forces on the work bench frame in accordance with ordinary vector practice, this bracing of the supports against sway transverse of the longitudinal length of the bench (fore-and-aft sway) is a reinforcing against distortion by force components in the YZ plane.

The work bench is secured against longitudinal sway by force components in the XY plane, by the rigid welded connections of the horizontal elements 19 to the vertical elements 18; by the long length of the elements 19 with which the stringers 44 are in contact; and by the long length of the panel 41 and the clamping piece 45. Distortion or horizontal sway in the plane is prevented by the panel 43 and especially by its gusset construction.

Although certain bracing has been described for preventing sway in the particular planes in which that bracing is most effective, it will be understood that force against a frame may be from any direction, and such force may have components in all planes. The reinforcing against distortion in each plane, therefore, makes the frame rigid in all directions.

Except for the brackets and clamping means, the entire frame is preferably made of undercut channel sections. Some of the channel elements at different locations are of different length, but there are only two different sizes of channel section, the smaller one of which is a running fit in the other so that these smaller sections slide freely in the other sections when putting the parts together during the assembly of the bench, when adjusting the positions of parts with respect to one another, and when taking a frame apart for storage or for moving.

FIGURE 11 shows an angular work bench made in accordance with this invention. The left-hand end of the work bench and the back frame are the same as in the construction shown in FIGURE 1; but at the right-hand end of the bench there is a front leg assembly 78 which is of much greater length, transversely of the bench, than is the leg assembly 27 at the left-hand end of the bench. This increase in the length of the leg assembly 78 is obtained by using long inner channel sections 79 in place of the shorter inner channel sections 36 previously described in connection with FIGURE 3. Except for this substitution of the longer channel sections 79 in place of the shorter channel sections 36, the front leg assembly 78 is of the same construction as already described in connection with FIGURE 3.

A second long front leg assembly 80 is connected to the back frame at an intermediate location between two of the back leg assemblies 17. The spacing between the front leg assemblies 78 and 80 is chosen for the corresponding dimension of whatever top panel is to be used on the right-hand end of the angle bench shown in FIGURE 11. The front leg assemblies 78 and 80 are connected together by a front stringer 72 of the selected length; and it will be apparent that the rearward end of the front leg assembly 80 can be adjusted lengthwise along the stringers 44 of the back frame to accommodate whatever length of stringer 72 is used. In accordance with the modular theory of the invention, certain unit lengths of front stringers 72 are available to match the dimensions of the standard panel sizes which are designed for the work bench. It is an advantage of the construction, however, that any special dimensions can be obtained in circumstances where the location of the work bench restricts the dimensions which can be used.

A longer front stringer 72 connects the leg assembly 27 to an intermediate location along the top channel section 79 of the front leg assembly 80. This connection will be described in detail in the description of FIGURE 14.

FIGURES 12 and 13 show the construction by which the front stringers 72 are connected to the front leg assemblies 27, 78 or 80. The connection illustrated in FIGURE 12 is a diagrammatic view for a front leg assembly 27 located at a connection between two work bench units. But the modifications for use at an end of a stringer will be explained.

The bracket 32 has an upwardly extending flange 84 at the forward end of a cut-out, in the bracket 32, and into which the stringer 72 fits, as shown clearly in FIGURE 13. When the front leg assembly 27 is used between two bench units, each of the stringers 72 extends across half the width of the bracket 32, and a connecting channel section 86 is located within the stringers 72. FIGURE 12 shows one stringer 72. The abutting stringer which would rest on the right-hand half of the bracket 32 is removed so as to show the inner channel 86 in full lines.

A clamping plate 88 (FIGURE 13) is located within the inner channel 86; and the bolts 74 which extend through the flanges 76, screw into the clamping plate 88. By this construction the bolts 74 connect the stringers 72 to the flanges 76 and at the same time clamp the stringers 72 to the connecting channel 86 located within the stringers. The connecting channel 86 is of the same cross section as the stringers of the back frame.

Where the front leg is at the end of a stringer 72, instead of at a connection between stringers of adjacent bench units, the front leg is positioned so that the stringer 72 extends across the full length of the bracket 32. In such a case the connecting channel 86 will, of course, be omitted; but the clamping plate 88 is used to secure the stringer to both flanges 76 of the bracket 32. Without the inner channel 86, the clamping plate 88 clamps directly against the inside surfaces of the undercut sides of the stringer 72.

FIGURE 14 shows the way in which a front stringer 72 is connected with a horizontal channel section 79 of a front leg assembly. This construction is similar to that used for connecting the rearward end of a front leg to the back frame except that a flat plate 90 is used in place of the angular plate 39 previously described in connection with FIGURES 3 and 6. The clamping plates and bolts for the flat plate 90, which correspond to those used with the angular plate 39, are indicated by the same reference characters and the construction will be apparent from that previously described, in connection with FIGURES 3 and 6. The plate 90 has the same tapered shape as the angular plate 39 to provide a gusset construction, as is shown in FIGURE 11.

FIGURES 15 and 16 show constructions by which the panel 63, or two adjoining panels 63 and 63′, can be connected to the frame of the work bench when the intended service is one which makes it necessary to hold the panels in place by more positive means than the friction grip of the cover plate 60 described in connection with FIGURE 9.

FIGURE 15 shows a Z bracket 92 which extends under a front stringer 72. The Z bracket 92 is secured to the stringer 72 by a bolt 94 which passes through an opening in the Z bracket, through the open side of the stringer 72 and into a threaded clamping piece 55. An upper leg of the Z bracket 92 fits against the bottom surface of the panel 63 and is connected to the panel 63 by a lag screw 96.

FIGURE 16 shows a bracket 98 which fits under a horizontal channel section 29 of a front leg assembly. A bolt 99 extends through the bracket 98 and through the open side of the channel section 29, and this bolt 99 threads into a clamping piece 55 to secure the bracket to the channel section 29.

At its upper end, on both sides of the channel section 29, the bracket 98 has legs 100 which fit against the bottom surfaces of the panels 63 and 63′. The bracket 98 is connected with the different panels, on opposite sides of the front leg assembly, by leg screws 96.

From the descriptions of the frames shown in FIGURES 1 and 11 it will be apparent that a great variety of frame shapes can be made whereby a long bench may have angular portions which extend forwardly, as in FIGURE 11; and angularly extending portions can be located at opposite ends of successive bench units so as to obtain greater length of the forwardly extending portions of the bench. A top panel 63 and the front stringer that supports it can be omitted between any two successive front leg assemblies where a gap in the bench top is desirable, but the back frame of the bench continues with the resulting rigidity and continuity of accessory services that may be supported by the back frame, such as electric power, compressed air, water, lights or a conveyor.

The adaptability of the bench of this invention to many different configurations by connecting different sections in various ways, and its adaptability to the convenient connection of accessories which form no part of the present invention, results partly from the fact that all of the vertical and horizontal elements of the frame are undercut channels with their ends open. Another feature that makes for adaptability is the facing downward of all of the transverse channels and the front stringer channels.

The adjustable foot assembly 25 is shown in detail in FIGURES 4 and 5. It includes an upper helically corrugated sleeve 108 which fits into the undercut channel element 18 of the back frame (or a vertical channel element of one of the front leg assemblies), the outer diameter of the sleeve 108 being of such size as to be substantially tangent to the inside surfaces of the walls of the channel element 18, as shown in FIGURE 5.

In order to hold the outer sleeve 108 securely in the channel element 18 there is a plate 110 bonded to one side of the sleeve 108, by welding or other suitable means. The upper end of the plate 110 is curved inwardly to facilitate the entry of the sleeve 108 and the attached plate 110 into the lower end of the channel element 18 during insertion of the foot assembly into the channel element. The inwardly curved upper portion of the plate 110 is indicated in FIGURE 4 by the reference character 114. Below this inwardly curved upper end 114, the plate 110 is originally flat and it is bowed, as shown in FIGURE 5, by the pressure of the edges of the channel element 18 as the leg assembly is forced upwardly into the channel element.

There is a flange 115 formed at the lower end of the outer sleeve 108 and this flange 115 is welded, or otherwise secured, to a saddle 116 which extends across the lower end of the vertical channel element 18. The saddle 116 has upturned sides 117 extending along the outside surfaces of opposite side walls of the vertical channel element 18. The weight of the bench is carried by the saddle 116 and is transmitted from this saddle to the other parts of the foot assembly.

The helical corrugations of the outer sleeve 108 provide threads for an inner sleeve 118 which is provided with helical corrugations of the same pitch and amplitude as the corrugations of the outer sleeve 108. Thus the inner sleeve 118 screws upwardly or downwardly in the outer sleeve 108 as the inner sleeve is rotated one way or the other.

There is an opening 120 through the lower end of the inner sleeve 118 for receiving a bar or other tool by which the inner sleeve 118 is rotated. At the lower end of the foot assembly there is a foot 122, preferably a pressed section, with a groove 124 near its upper end. The lower end of the inner sleeve 118 converges inwardly and engages the groove 84.

The surface at the lower end of the inner sleeve 118, which contacts with a confronting surface of the groove 124, supports the work bench from the foot 122. The engagement of the lower end of the sleeve 118 in the groove 124 is loose enough, however, to permit the sleeve 118 to rotate while the foot 122 remains stationary.

A jam nut 126, which is preferably a short helically corrugated sleeve, screws over the inner sleeve 118 and is screwed up into contact with the flange 115 to hold the inner sleeve 118 against rotation and thus maintain the adjustment of the leg assembly at any desired height.

The preferred embodiment of the invention has been illustrated and described, but changes and modifications can be made and some features can be used in different combinations without departing from the invention as defined in the claims.

What is claimed is:

1. A work bench comprising a back frame having a group of back leg assemblies, another group comprising front leg assemblies, spaced longitudinally along the bench, each leg assembly of one group comprising a vertical element and vertically spaced horizontal elements secured to the vertical element and having guide means extending continuously from one side to the other of the vertical element extending longitudinally of the bench and separate from the corresponding elements of any other assembly of that group, each leg assembly of the other group comprising a vertical element and two vertically spaced horizontal elements permanently and rigidly secured to the vertical element and extending transversely of the bench and separate from the corresponding elements of any other assembly of that group, bracket means extending into said guide means and adjustable along the length of said guide means and connecting the leg assemblies rigidly to one another, longitudinal stringers connecting successive leg assemblies, and a work surface panel supported from said leg assemblies.

2. The work bench described in claim 1 and in which the vertically and horizontally extending elements of both leg assemblies, and the stringers of the back frame, are undercut channels, and the bracket means connecting the front leg assemblies to the back frame include an angular plate with panels of the plate extending across the open sides of the channels separate clamping pieces for each panel of the plate, each clamping piece being located within an undercut channel, and bolts extending through the panels and clamping pieces.

3. The work bench described in claim 2 and in which the panels of the plate are in angular relation to one another and one panel of the plate extends across an end of the transversely extending horizontal element of the front leg assembly to which the plate is connected, the bolts for connecting the angular plate to the channel of the back frame being located on opposite sides of the end of said transversely extending horizontal element of the front leg assembly, whereby said bolts are accessible when the horizontal element is secured to the back frame.

4. The work bench described in claim 1 and in which each of the transversely extending horizontal elements include two parts, one of which has an end portion that slides in a complementary end portion of the other to adjust the length of said transversely extending horizontal element, both of said parts having their ends that are remote from their telescoping end portions secured to the back frame and to the vertical element of the front leg assembly respectively, and said parts being channels of slightly different size, and releasable means for locking the channels against sliding telescoping movement with respect to one another including an outside clamping plate, an inner clamping piece within the channel, and a bolt extending through the outside clamping plate and the inner clamping piece.

5. A modular work bench comprising a back frame having a vertical element and at least two spaced elements which extend longitudinally of the bench, each of the longitudinally extending elements including a first undercut channel section permanently and rigidly secured to the vertical element, the channel being continuous and extending beyond both sides of the vertical element and at least one stringer that is an undercut channel section slightly smaller than the first undercut channel section and slidable therein, front leg assemblies, each of which includes a vertical element and two spaced horizontally extending elements permanently and rigidly secured to the vertical elements at their forward ends and extending transversely of the bench and to the back frame, the vertical and horizontally extending elements of the front leg assemblies being undercut channel sections, similar to those of the back frame, bracket means connecting the leg assemblies to the back frame including an angular plate having a horizontal panel and a vertical panel extending in front of the open sides of channels of the different frames, clamping pieces within the channels, and bolts extending through the panels and into the clamping pieces the vertical panel being of substantial length in the direction of the longitudinal extent of the work bench and extending along the back frame for a substantially greater distance than the width of the horizontally extending elements of the front leg assemblies, and the horizontal panel being of substantially greater width than the horizontally extending elements at its rearward end of decreasing width toward its forward end and providing a gusset construction for imparting stiffness to the work bench in a horizontal plane.

6. The modular work bench described in claim 5 and in which the front leg assembly has brackets at the upper and lower part of its vertically extending element for connecting the vertically extending element and the horizontally extending elements, the elements being permanently and rigidly secured to the brackets, and the brackets including gusset sections for imparting rigidity to the front leg assembly in a vertical plane.

7. The modular work bench described in claim 5 and in which each of the horizontal elements of the front leg assembly includes two parts, one of which slides within the other, both parts being similar undercut channels of slightly different size, and both channels being open on the same side, an outside clamping plate in contact with the open side of the outer channel, an inner clamping piece in contact with the inner side of the channel edges of the inner channel, a bolt securing the clamping plate and clamping piece together, brackets at the upper and lower ends of the vertical element of the front leg, the brackets being permanently secured to the vertical element and the horizontally extending elements, and the brackets including gussets for imparting rigidity to the front leg assembly in a vertical plane.

8. The modular work bench described in claim 7 and in which the horizontal panel of the angular plate cooperates with a long clamping piece within the horizontally extending element of the front leg assembly, and the two parts of the horizontal element are clamped by a plurality of inner clamping pieces which are of parallelogram shape with a length, measured normal to the ends of the parallelogram, substantially equal to the width of the inner part of the horizontal element of the front leg assembly.

9. A modular work bench including a back frame having vertical elements longitudinally spaced along said frame and having at least two vertically spaced horizontal elements extending longitudinally of the bench, front leg assemblies each including a vertical element and two vertically spaced horizontal elements permanently and rigidly secured to the vertical element and extending transversely of the bench, the vertical and horizontal elements of both leg assemblies being undercut channels, bracket means connecting the horizontal elements of the front leg assembly to the horizontal elements of the back frame, the horizontal elements of the back frame including stringers extending longitudinally of the bench and connecting successive vertical elements of the back frame, the stringers being clamped to the other parts of the back frame by the same bracket means that connect the front leg assemblies to the back frame, and in which each of the horizontal elements of the back frame includes an undercut channel secured to a vertical element of the back frame and the longitudinal stringers of the back frame extend into the undercut channels, and the stringers are themselves undercut channels which are slightly smaller than the undercut channels that are secured to the vertical element for free sliding movement of the stringers in the other undercut channels of the back frame.

10. The modular work bench described in claim 9 and in which the stringer channels are open at their ends for receiving clamping pieces inserted into a first longitudinal stringer and another longitudinal stringer of a successive section of the work bench with the other longitudinal stringer brought into abutting relation with the first longitudinal stringer at a middle location along the length of a channel secured to one of the vertical elements of the back frame and in which some of the longitudinal stringers are continuous through alternate vertical elements of the back frame, and the work bench has a supporting foot under vertical elements where the stringers are not continuous.

11. A modular work bench including a back frame having vertical elements longitudinally spaced along said frame and having at least two vertically spaced horizontal elements extending longitudinally of the bench, front leg assemblies each including a vertical element and two vertically spaced horizontal elements permanently and rigidly secured to the vertical element and extending transversely of the bench, the vertical and horizontal elements of both leg assemblies being undercut channels, bracket means connecting the horizontal elements of the front leg assembly to the horizontal elements of the back frame, the horizontal elements of the back frame including stringers extending longitudinally of the bench and connecting successive vertical elements of the back frame, the stringers being clamped to the other parts of the back frame by the same bracket means that connect the front leg assemblies to the back frame, and in which the bracket means connecting the front leg assemblies with the back frame includes an angular plate with horizontal and vertical panels confronting the horizontal elements of the back frame and front leg assemblies, respectively, clamping pieces that fit within the channels of the horizontal elements of both back frame and front leg assemblies, bolts extending through the panels of the angular plate and through the open sides of the channels and into the channels, the horizontal element of the front leg assembly extending to the vertical panel of the bracket, and the bolts through the vertical panel being located toward the opposite ends of the panel and on opposite sides of the front leg assembly, each of the horizontal elements of the front leg assembly including two parts, one of which slides within the other to provide adjustment of the length of the horizontal elements of the front leg assembly, an outside clamping plate and an inner clamping piece with a connecting bolt for holding the parts of each horizontal element of the front leg assembly against movement with respect to one another.

12. A work bench construction including a frame made of separate parts secured together by clamping means and for connection together in various relations to change the size or configuration of the bench, said frame including a back structure having both vertical and horizontal elements, a front structure including legs and longitudinal stringers extending between legs which are spaced from one another along the length of the bench, and horizontal transverse elements connecting the back and front structures, the vertical and horizontal elements, stringers and transverse elements all being undercut channel sections with those of the back structure having their open sides facing forward, and the other channel sections having their open sides facing downward from the channel sections of the back structure, the front structure and the transverse elements telescoping within one another to provide adjustable length and width for the bench construction.

13. The work bench construction described in claim 12 and in which the transverse elements are connected to the horizontal elements of the back structure by releasable clamping means located beyond the transverse elements and accessible at all times, said clamping means being movable along said horizontal elements to different positions.

14. The work bench construction described in claim 12 and in which various of the channel sections are held in assembled relation in the frame by clamping means that include plates outside of the channel sections, clamping pieces within the channels and behind the undercut portions thereof, and bolts extending through the plate, the open side of the channel section and the clamping pieces.

15. A work bench comprising a back frame, front leg assemblies extending forwardly from the back frame and each of which includes a vertical element and two horizontal elements, a bracket at the top of the vertical element and rigidly connecting the vertical element with one of the horizontal elements, the bracket having a surface extending continuously across the full width thereof for supporting stringers, stringers extending from the bracket of one front leg assembly and half way across the width of the bracket of a second front assembly, another stringer extending from the first stringer across the other half of the bracket and on to still another front leg assembly, flanges on each side of the bracket for connection with a stringer, an insert fitting within the stringers that extend across the different halves of the bracket of the second leg assembly, and a fastening element that connects one stringer to the flange on one half of the bracket and at the same time secures that stringer to the insert fitting, another fastening element that connects the next stringer to the flange on the other half of the bracket and at the same time secures that stringer to the insert fitting, whereby said insert fitting holds the stringers together in end-to-end relation.

16. The work bench described in claim 15 and in which the stringers are undercut channel sections with their open sides facing down, and the insert is a shorter undercut channel section of a cross section that telescopes into the stringers, and there is a clamping plate in the insert above the flanges of the bracket, and the fastening elements are screws that pass through the flanges and open sides of the channel sections and that screw into said plate.

17. A telescoping support frame and leg arrangement comprising at least two front leg assemblies and at least two rear leg assemblies and a plurality of telescoping sections connecting said leg assemblies together, said front leg assemblies each including a front vertical stanchion adjustable in height and two extendable telescoping struts each affixed at one end to the top and bottom ends respectively of said front vertical stanchion and substantially at right angles thereto, means at the junction between said top telescoping strut and said front vertical stanchion for slidably supporting at least one of said telescoping sections, said rear leg assemblies each including a rear vertical stanchion adjustable in height, upper and lower cross-pieces secured to said rear vertical stanchion at right angles thereto, at least some of the telescoping sections being slidable in said cross-pieces connecting the rear vertical stanchions together in the rear of the support frame, means on the free ends of said extendable telescoping struts for sliding adjustment in said crosspieces and adjoining telescoping sections whereby said bottom strut is adjustable laterally simultaneously with said top telescoping strut thereby removably fixing said front leg assembly to said rear leg assembly whereby said support frame is extendable and contractible in height, width and length.

18. A telescoping support frame and leg arrangement comprising at least two front leg assemblies and at least two rear leg assemblies, a plurality of front and rear telescoping sections connecting said leg assemblies together, said front leg assemblies each including a front vertical stanchion adjustable in height and one extendable strut extending from the top of said front vertical stanchion in a rearward direction, means at the junction between the extendable strut and the front vertical stanchion for supporting at least one of said front telescoping sections while permitting the latter to slide therein comprising a pair of spaced connector members connecting said extendable strut to the adjacent front vertical stanchion, a guide element secured to said spaced connector members and together forming a cut-out portion which is adapted to receive one of said telescoping sections, said rear leg assembly including a rear vertical stanchion adjustable in height, a cross piece secured to said rear vertical stanchion and extending on either side thereof substantially transversely to the latter, at least one of said rear telescoping sections being connected at one end to said extendable strut and operatively slidably connected at the other end thereof to said rear vertical stanchion whereby said front vertical stanchion and extendable strut may be slid laterally along said support frame to a multiplicity of selected positions.

19. A telescoping support frame and leg arrangement comprising at least two front leg assemblies and at least two rear leg assemblies, a plurality of front and rear telescoping sections connecting said leg assemblies together, said front leg assemblies each including a front vertical stanchion adjustable in height and at least one extendable strut extending from the top of said front vertical stanchion in a rearward direction, means at the junction between the extendable strut and the front vertical stanchion for supporting at least one of said front telescoping sections directly over said front vertical stanchion while permitting the latter to slide therein, said rear leg assembly including a rear vertical stanchion adjustable in height, a cross piece secured to said rear vertical stanchion and extending on either side thereof substantially transversely to the latter, at least one of said rear telescoping sections being connected at one end to said extendable strut and operatively slidably connected at the other end thereof to said rear vertical stanchion whereby said front vertical stanchion and extendable strut may be slid laterally along said support frame to a multiplicity of selected positions.

20. A telescoping support frame and leg arrangement comprising at least two front leg assemblies and at least two rear leg assemblies, a plurality of front and rear telescoping sections connecting said leg assemblies together, said front leg assemblies each including a front vertical stanchion adjustable in height and at least one extendable strut extending from the top of said front vertical stanchion in a rearward direction, means at the junction between the extendable strut and the front vertical stanchion for supporting at least one of said front telescoping sections while permitting the latter to slide therein comprising a pair of spaced connector members connecting said extendable strut to the adjacent front vertical stanchion, a guide element secured to said spaced connector members and together forming a cut-out portion which is adapted to receive one of said telescoping sections, a releasable locking member for fixing at least one of the telescoping sections in said cut-out portion comprising a first flat plate secured to said spaced connector members, a second flat plate insertable in said telescoping section in aligned superposed relationship with said first flat plate, and securing means for releasably holding said plates and said telescoping section together.

21. A work bench structure including a frame and a top panel that rests upon the frame, a longitudinally extending back element connected to the frame and having a forwardly-extending part that covers the rearward edge region of the top surface of the panel, the back element being connected to the frame by adjustable connections that are movable up and down to change the spacing of the forwardly extending part from the top of the frame to accommodate the structure to top panels of different thickness, and in which the frame includes vertically-extending rearward legs spaced from one another lengthwise of the bench, each of the legs comprising an undercut channel section terminating at a level at least as low as the top of the frame on which the panel rests, and the connections joining the back element to the frame include another undercut channel section at each leg section and somewhat smaller than the leg section and slidable in the leg section with a telescoping movement, and clamping means at each leg section including a plate outside of the leg section and a bolt extending through the plate and the open sides of the telescoping channel sections and into a clamping piece within the smaller channel section.

References Cited in the file of this patent

UNITED STATES PATENTS

| | | |
|---|---|---|
| 1,044,889 | Hyde | Nov. 19, 1912 |
| 1,356,062 | Gorsline | Oct. 19, 1920 |
| 1,357,050 | Hathorne | Oct. 26, 1920 |
| 1,417,565 | Ralph | May 30, 1922 |
| 1,473,817 | Gorsline | Nov. 13, 1923 |
| 2,206,774 | Hallowell | July 2, 1940 |
| 2,345,650 | Attwood | Apr. 4, 1944 |
| 2,445,453 | Pennington | July 20, 1948 |
| 2,489,933 | Schwarz | Nov. 29, 1949 |
| 2,506,640 | Hawes | May 9, 1950 |
| 2,556,611 | Borgman | June 12, 1951 |
| 2,654,487 | Degener | Oct. 6, 1953 |
| 2,719,383 | Emmert | Oct. 4, 1955 |
| 2,731,316 | Cohen | Jan. 17, 1956 |
| 2,739,776 | Terando | Mar. 27, 1956 |
| 2,751,258 | Brattland | June 19, 1956 |
| 2,759,779 | Bergman | Aug. 21, 1956 |
| 2,787,087 | Whitman | Apr. 2, 1957 |
| 2,906,574 | Bullock | Sept. 29, 1959 |
| 2,909,400 | Johnson et al. | Oct. 20, 1959 |
| 2,981,577 | Trautmann | Apr. 25, 1961 |